(12) United States Patent
Potera

(10) Patent No.: US 7,825,901 B2
(45) Date of Patent: Nov. 2, 2010

(54) AUTOMATIC LANGUAGE SELECTION FOR WRITING TEXT MESSAGES ON A HANDHELD DEVICE BASED ON A PREFERRED LANGUAGE OF THE RECIPIENT

(75) Inventor: Pawel J. Potera, Urbana, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 752 days.

(21) Appl. No.: 11/003,040

(22) Filed: Dec. 3, 2004

(65) Prior Publication Data

US 2006/0119583 A1 Jun. 8, 2006

(51) Int. Cl.
*G06F 3/02* (2006.01)
(52) U.S. Cl. ............ 345/171; 345/172; 455/456.6
(58) Field of Classification Search ......... 345/168–172; 455/437, 456.5, 456.6, 466
See application file for complete search history.

(56) References Cited

U.S. PATENT DOCUMENTS

| | | | |
|---|---|---|---|
| 5,952,942 A * | 9/1999 | Balakrishnan et al. ....... 341/20 |
| 6,226,514 B1 | 5/2001 | Lorieau | |
| 6,766,179 B1 * | 7/2004 | Shiau et al. ............. 455/566 |
| 6,873,317 B1 * | 3/2005 | Griffin et al. ............. 345/168 |
| 6,985,147 B2 * | 1/2006 | Asakawa et al. .......... 345/467 |
| 7,007,233 B1 * | 2/2006 | Iwayama ................ 715/531 |
| 7,195,409 B2 * | 3/2007 | Horii et al. .............. 400/76 |
| 7,207,011 B2 * | 4/2007 | Mulvey et al. ............ 715/812 |
| 7,218,249 B2 * | 5/2007 | Chadha ................. 341/23 |
| 7,224,989 B2 * | 5/2007 | Kraft .................. 455/466 |
| 7,414,613 B2 * | 8/2008 | Simelius ................ 345/168 |
| 2003/0073451 A1 | 4/2003 | Kraft | |
| 2004/0203687 A1 * | 10/2004 | Hasegawa ............... 455/418 |
| 2006/0033718 A1 * | 2/2006 | Griffin .................. 345/168 |

FOREIGN PATENT DOCUMENTS

EP 1 450 267 A 8/2004
EP 1 480 420 A 11/2004

* cited by examiner

*Primary Examiner*—Kimnhung Nguyen
(74) *Attorney, Agent, or Firm*—Hisashi D. Watanabe

(57) ABSTRACT

A mobile station (101) and a method of operating the mobile station (101) are provided. The mobile station (101) determines a preferred language of an electronic message recipient (605) when a user initiates an electronic messaging application and selects a first recipient from an address book (309). The mobile station (101) launches a dictionary for the preferred language if the dictionary is available in memory (205) and not already active from a previous session. If the dictionary for the preferred language is not available in memory (205), the mobile station (101) may download it from a remote server (121).

2 Claims, 6 Drawing Sheets

AUTOMATIC LANGUAGE SELECTION FOR WRITING TEXT MESSAGES ON A HANDHELD DEVICE BASED ON A PREFERRED LANGUAGE OF THE RECIPIENT

FIELD OF THE INVENTION

The present invention relates generally to electronic handheld devices, and more particularly to mobile stations, comprising text entry capability and a software dictionary for checking text entry spelling and grammar and word completion suggestion.

BACKGROUND OF THE INVENTION

Many handheld electronic devices incorporate a keypad, either via a software screen display or a physical electronic keyboard, to facilitate user entry of text. Various software applications make use of the text entry such as email, short-message-service, word processors etc. Many of the various applications comprise a dictionary, or a combination of a dictionary and thesaurus, which may automatically correct spelling and typographical errors and suggest corrections for spelling as well as grammar. Additionally such dictionaries typically provide word completion suggestions based on the first one or more characters entered, which saves the user keystrokes by allowing selection of a suggested word.

A software dictionary or thesaurus will generally have a default setting based on a preferred language of the handheld device user. More particularly, an operating system software will provide default settings such as language, in which the selected language setting also controls selection of an appropriate dictionary.

For example, if a user prefers English, and has selected English as a default language, then any application employing text entry, such as email, will automatically make use of an English language dictionary or thesaurus to check spelling or grammar of subsequent text entries and may also provide suggested word completion.

In today's global society however, many users communicate in several languages and also wish to compose email or other forms of text using a variety of languages. If the user wishes to compose text using a language other than the default language, the user must manually change either the default settings, or the specific dictionary or thesaurus selection in order to have spell check or grammar check capability and word completion suggestions. For mobile devices this is somewhat of an inconvenience.

Therefore a need exists for an apparatus and method which may select an appropriate dictionary without the need for user intervention or changing of default settings.

DETAILED DESCRIPTION OF THE PREFERRED EMBODIMENTS

To address the above-mentioned need, a method and apparatus for determining a preferred language and launching an appropriate dictionary is provided herein.

In accordance with the present invention, a mobile station comprises an application, which may be an electronic messaging application or a separate application capable of interfacing with an electronic messaging application. The mobile station determines a preferred language of an electronic message recipient when a user initiates an electronic messaging application and selects a first recipient from an address book. The mobile station launches an appropriate dictionary for the preferred language of the recipient, if the dictionary is available in memory and not already active from a previous session. If the dictionary for the preferred language is not available in memory, the mobile station may download it from a remote server, store it in memory, and launch it for use in the current session. The user need not change language default settings for the operating system or for the specific messaging application.

Figure 1:
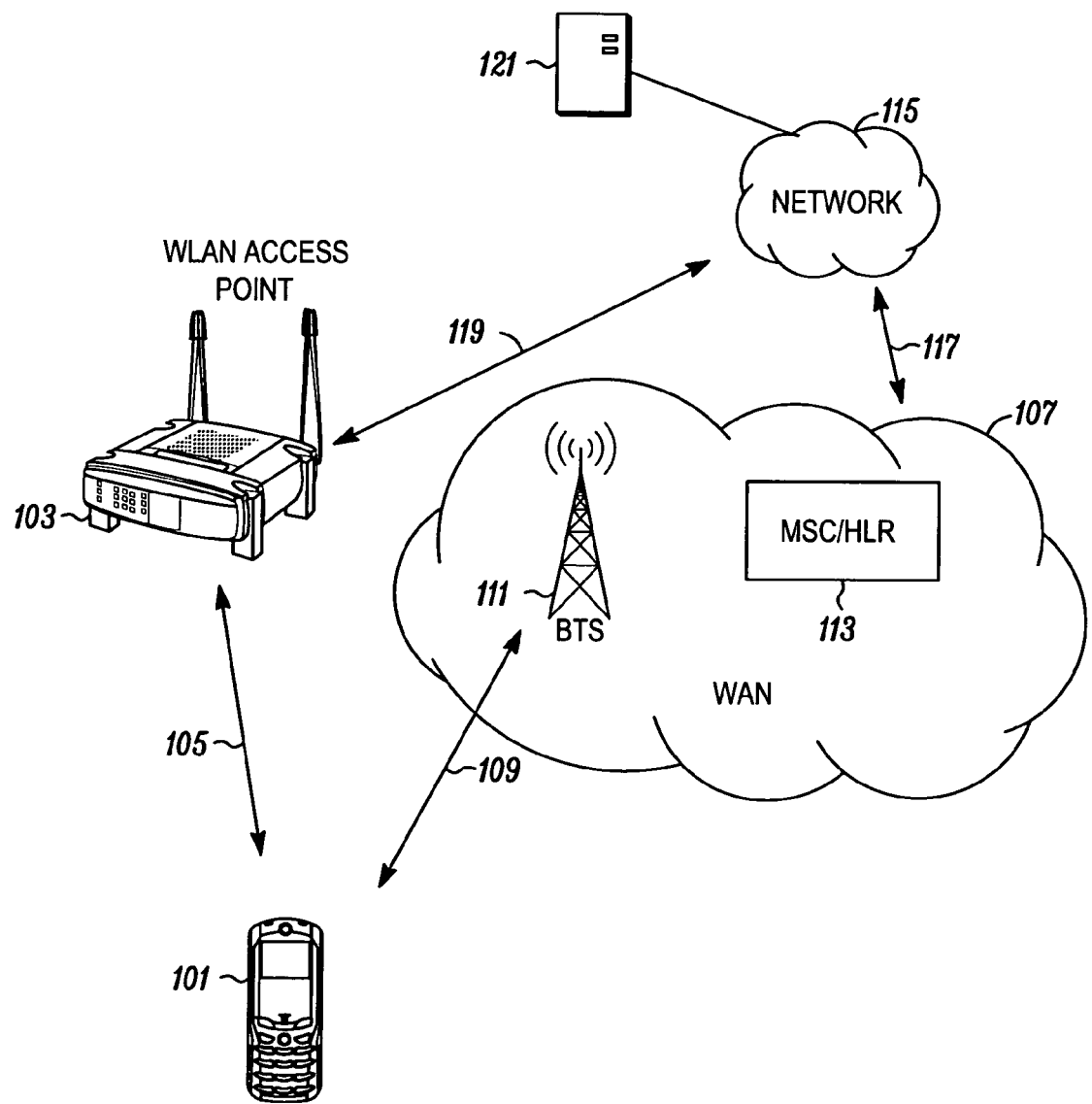
FIG. 1 is a block diagram illustrating a network infrastructure in which a mobile station may operate in accordance with embodiments of the present invention.

Turning now to the drawings wherein like numerals represent like components, FIG. 1 is a block diagram illustrating a network infrastructure in which a mobile station may operate in accordance with some embodiments of the present invention. In FIG. 1, mobile station 101 communicates with a Wireless Local Area Network (WLAN) access point 103 using wireless interface 105, and with a Wide Area Network (WAN) 107 using wireless interface 109 and Base Station Transceiver (BTS) 111.

The WAN 107 may be for example, a cellular network and further comprise a Mobile Switching Center (MSC) with a Home Location Register (HLR) such as MSC/HLR 113. The WAN 107 may access other networks such as network 115 via connections 117 which may be any of various suitable physical connections and employ any of various suitable transport protocols such as IP.

It is to be understood that the WAN 107 as shown in FIG. 1 is for illustrative purposes only, and that the WAN will comprise a number of BTSs, MSCs, HLRs, as well as other components not specifically mentioned herein.

Similarly, WLAN access point 103 may access network 115 via a connection 119 which may be any suitable physical connection including, but not limited to; a leased telephone line, T1, E1, infra-red, or a radio frequency point-to-point connection and employ any suitable transport protocol. Network 115 allows access to, and communication with, a server 121, which may in some embodiments be an application server or a file server.

Figure 2:
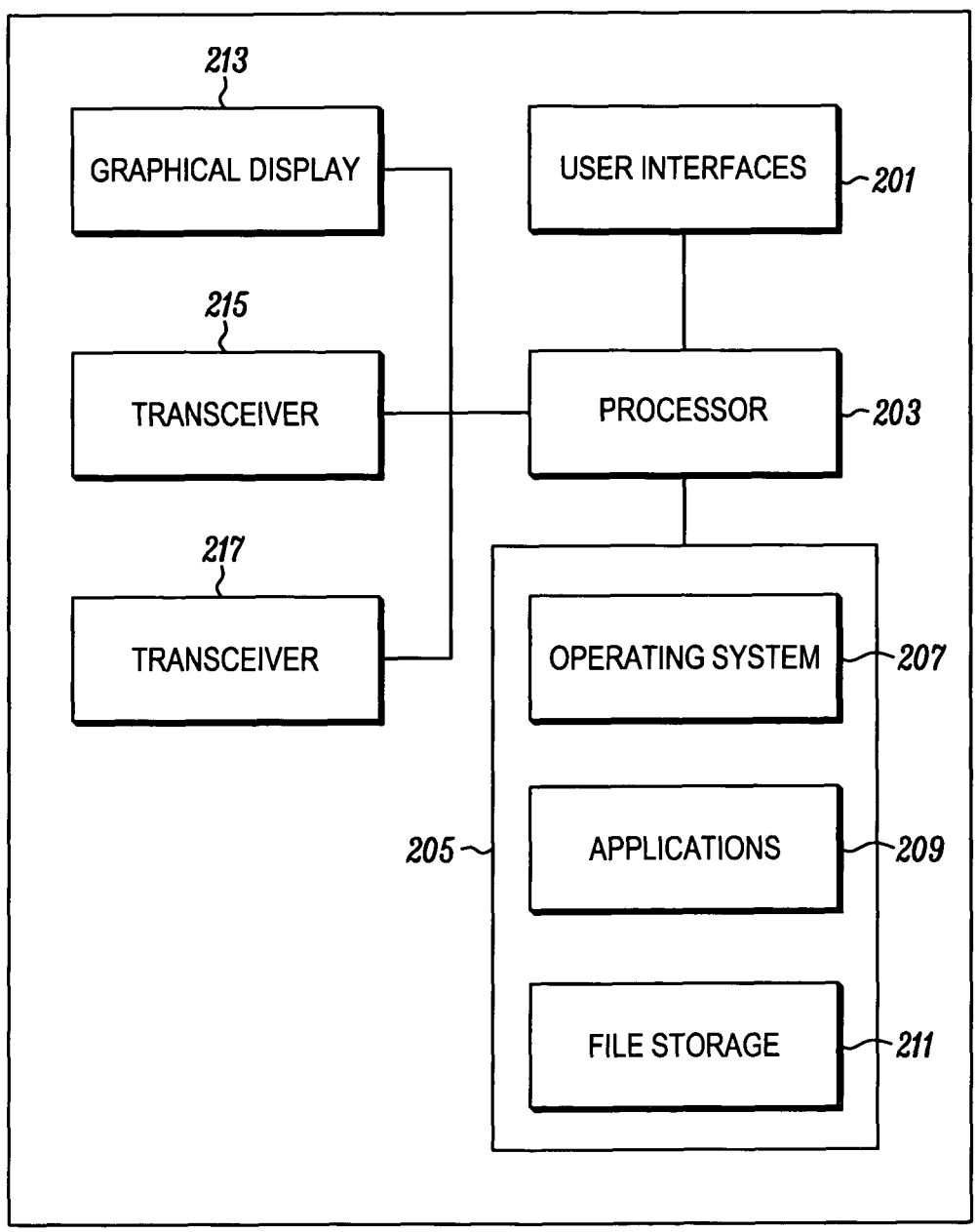
FIG. 2 is a block diagram illustrating the primary components of a mobile station in accordance with some embodiments of the present invention.

Turning now to FIG. 2, the primary components of a mobile station 200 in accordance with some embodiments of the present invention are illustrated.

Mobile station 200 comprises user interfaces 201, at least one processor 203, and a memory 205. Memory 205 has storage sufficient for the mobile station operating system 207, applications 209 and general file storage 211. Mobile station 200 user interfaces 201 may be a combination of user interfaces including but not limited to a keypad, touch screen, voice activated command input, and gyroscopic cursor controls.

Mobile station 200 has a graphical display 213, which may also have a dedicated processor and/or memory, drivers etc. which are not shown in FIG. 2. It is to be understood that FIG. 2 is for illustrative purposes only and is for illustrating the main components of a mobile station in accordance with the present invention, and is not intended to be a complete schematic diagram of the various components required for a mobile station. Therefore, a mobile station may comprise various other components not shown in FIG. 2 and still be within the scope of the present invention.

Returning to FIG. 2, the mobile station 200 also comprises a number of transceivers such as transceivers 215 and 217. Transceivers 215 and 217 may be for communicating with various wireless networks such as WLAN AP 103 and WAN 107 using for example one or more of 802.11, Bluetooth™, IrDA, HomeRF, GSM, CDMA, CDMA2000, UMTS, etc.

Mobile station 200 applications 209 and file storage 211 further comprise at least one electronic messaging application that utilizes text input by the user, and may have at least one dictionary for a particular language such as English, Spanish, Polish, Italian, etc. Further, the applications 209 and file storage 211 may comprise an electronic messaging application that supports character sets such as Cyrillic, Chinese, etc. and may have dictionaries for corresponding languages such as Russian, Serbian/Croatian, Chinese, Japanese, etc.

Figure 3:
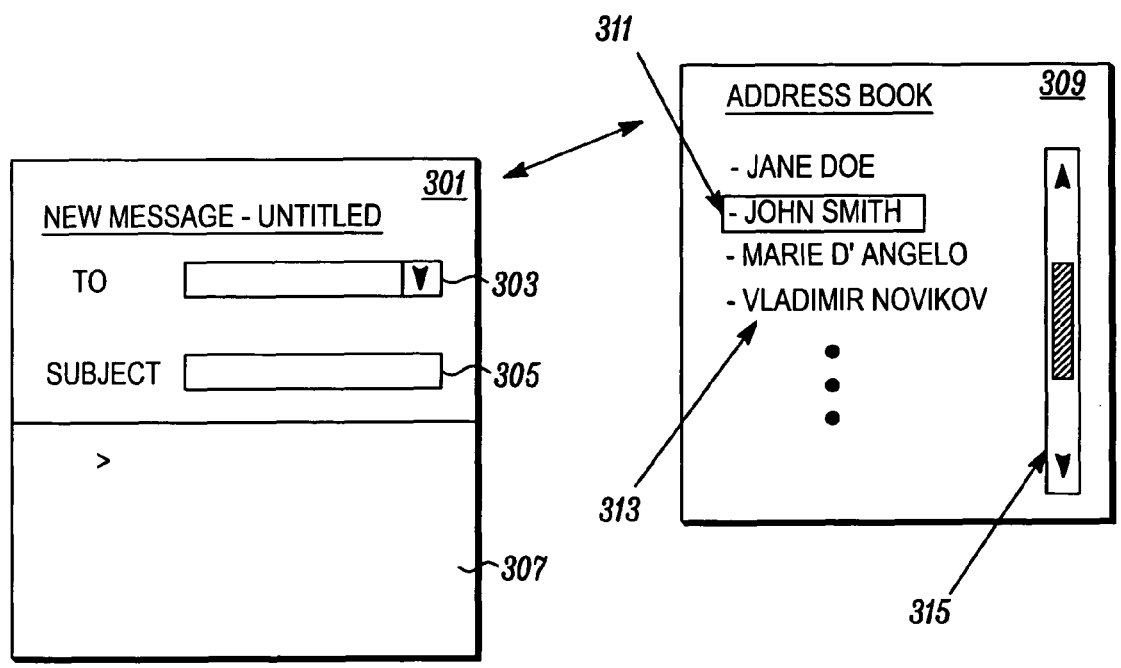
FIG. 3 is a block diagram illustrating a messaging application user interface in accordance with an embodiment of the present invention.

Turning now to FIG. 3, an application user interface in accordance with an embodiment of the present invention is illustrated. A mobile station electronic messaging application such as email, short-message-service (SMS) etc., may provide a message composition window such as new message window 301. New message window 301 may comprise at least a "To" field 303, a "Subject" field 305, and a message text entry field 307. The "To" field 303 may provide a pull-down menu, or otherwise link to a new menu window, for an address book menu 309. Address book menu 309 may further comprise a selection cursor 311, a selectable list of alphanumeric entries 313, and a scrollbar 315. A user may scroll through the selectable list 313 and select one or more message recipients. The selection or selections will then populate "To" field 303.

It is to be understood that the menus illustrated by FIG. 3 are for exemplary purposes only and that many possible menu configurations are conceivable, and that any such conceivable menu configurations would remain within the scope of the various embodiments of the present invention.

Returning to FIG. 3, upon the user selecting the recipient a mobile station application, which in some embodiments may be the electronic messaging application will determine a preferred language of the message recipient. In the case of multiple recipients, the first selected recipient will determine the preferred language for the message. Based upon the preferred language, the mobile station will launch an appropriate dictionary for spell or grammar checking, and word completion suggestions, during composition of the message subject and body text. The user may then enter a subject into "Subject" field 305 and the message body into message text entry field 307 in any desired order.

Spell checking may occur as text is typed into the fields, or may be performed as a check after completion of text entry as understood by one of ordinary skill in the art. Likewise, word completion suggestions may be provided as the user enters one of more characters of a word as understood by one of ordinary skill in the art.

Figure 4:
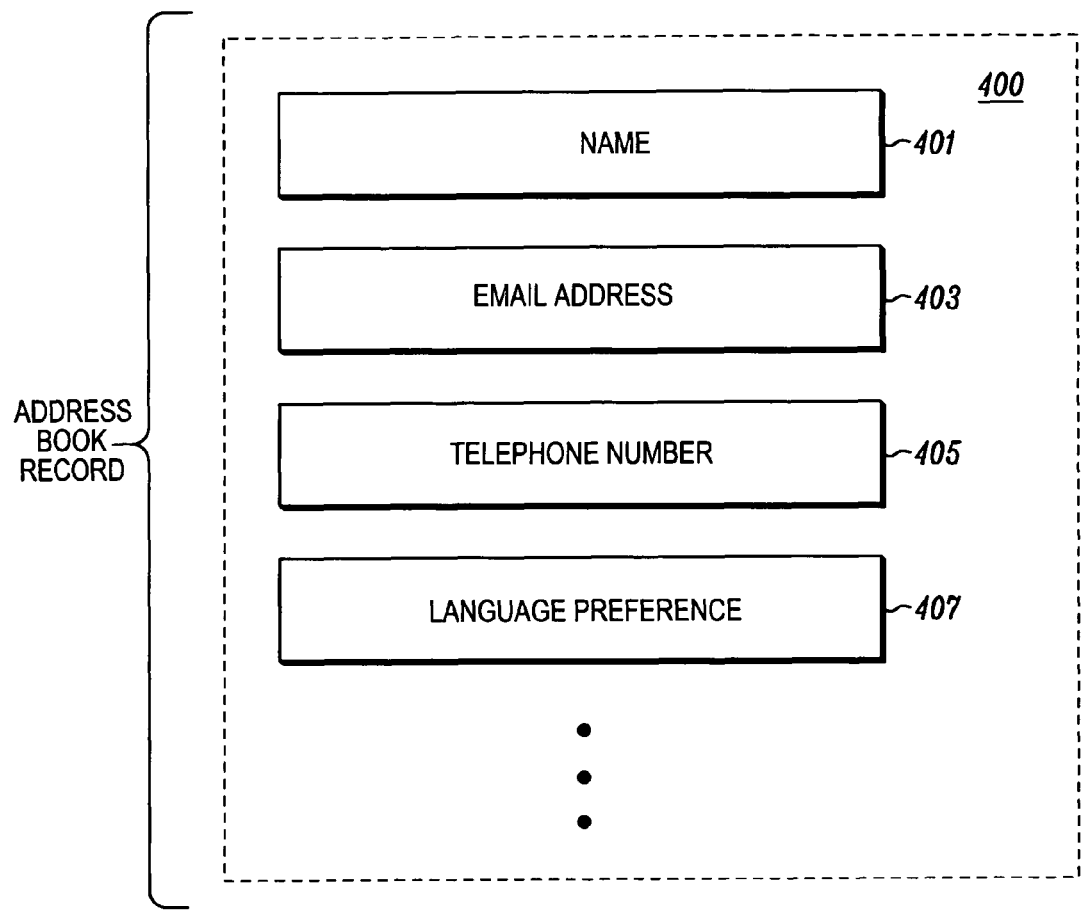
FIG. 4 is a block diagram illustrating an exemplary address book entry in accordance with an embodiment of the present invention.

FIG. 4 is a block diagram illustrating an exemplary address book entry in accordance with an embodiment of the present invention. An address book entry 400 comprises at least a name field 401, and an email address field 403 which may by any appropriate electronic address such as an SMS address etc. Other fields may also be provided such as a telephone number field 405.

In embodiments of the present invention, the address book entry 400 comprises a language preference field 407 which is used to determine which dictionary to launch prior to message composition.

Figure 5:
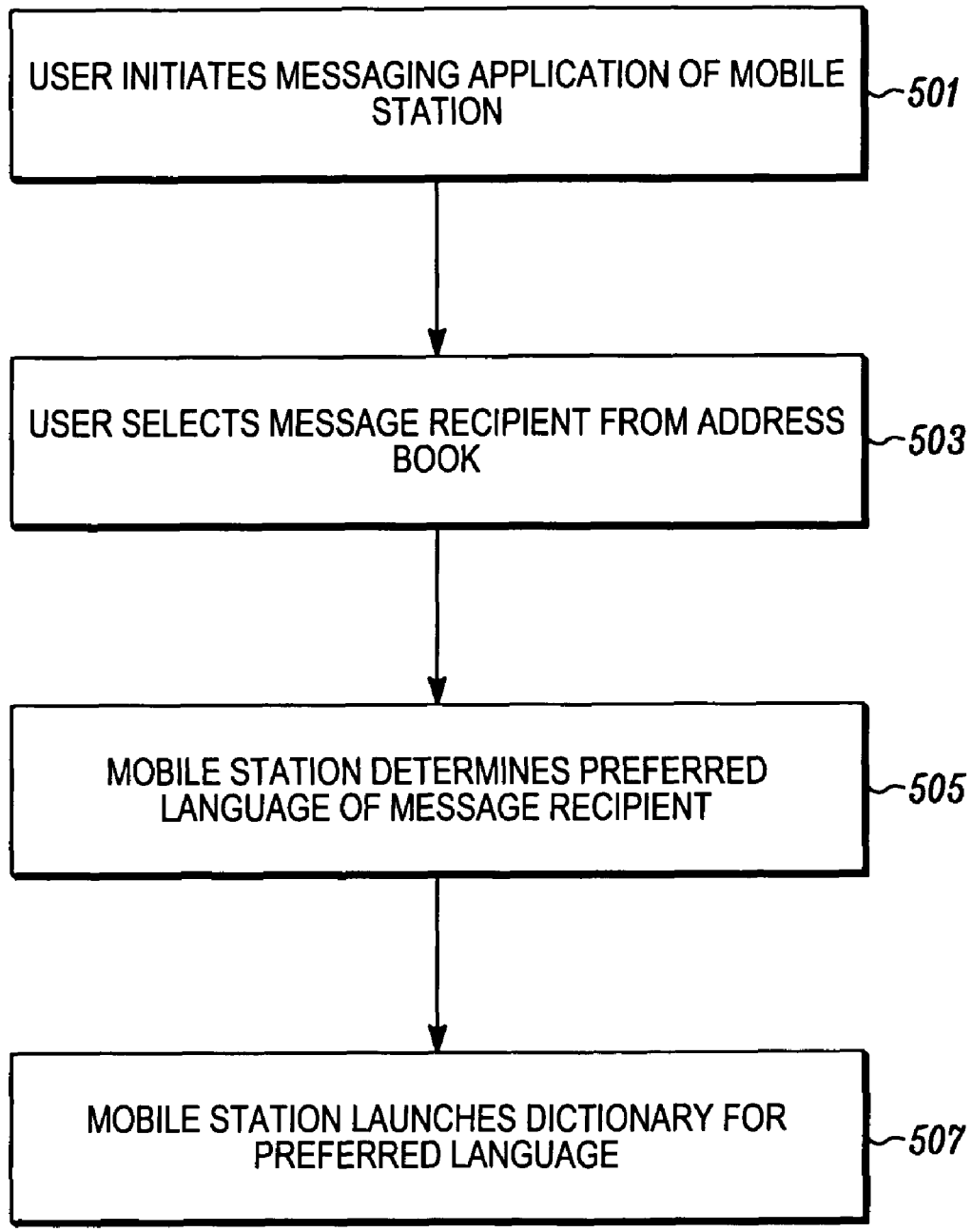
FIG. 5 is a flow diagram illustrating a basic operation of some embodiments of the present invention.

FIG. 5 is a flow diagram illustrating a basic operation of some embodiments of the present invention. In block 501, a user initiates a messaging application and in block 503 selects one or more message recipients from an address book. In block 505, the mobile station determines a preferred language for the message recipient based on a preferred language field of an address book entry. In block 507, the mobile station launches the appropriate dictionary for the message recipient's preferred language.

Figure 6:
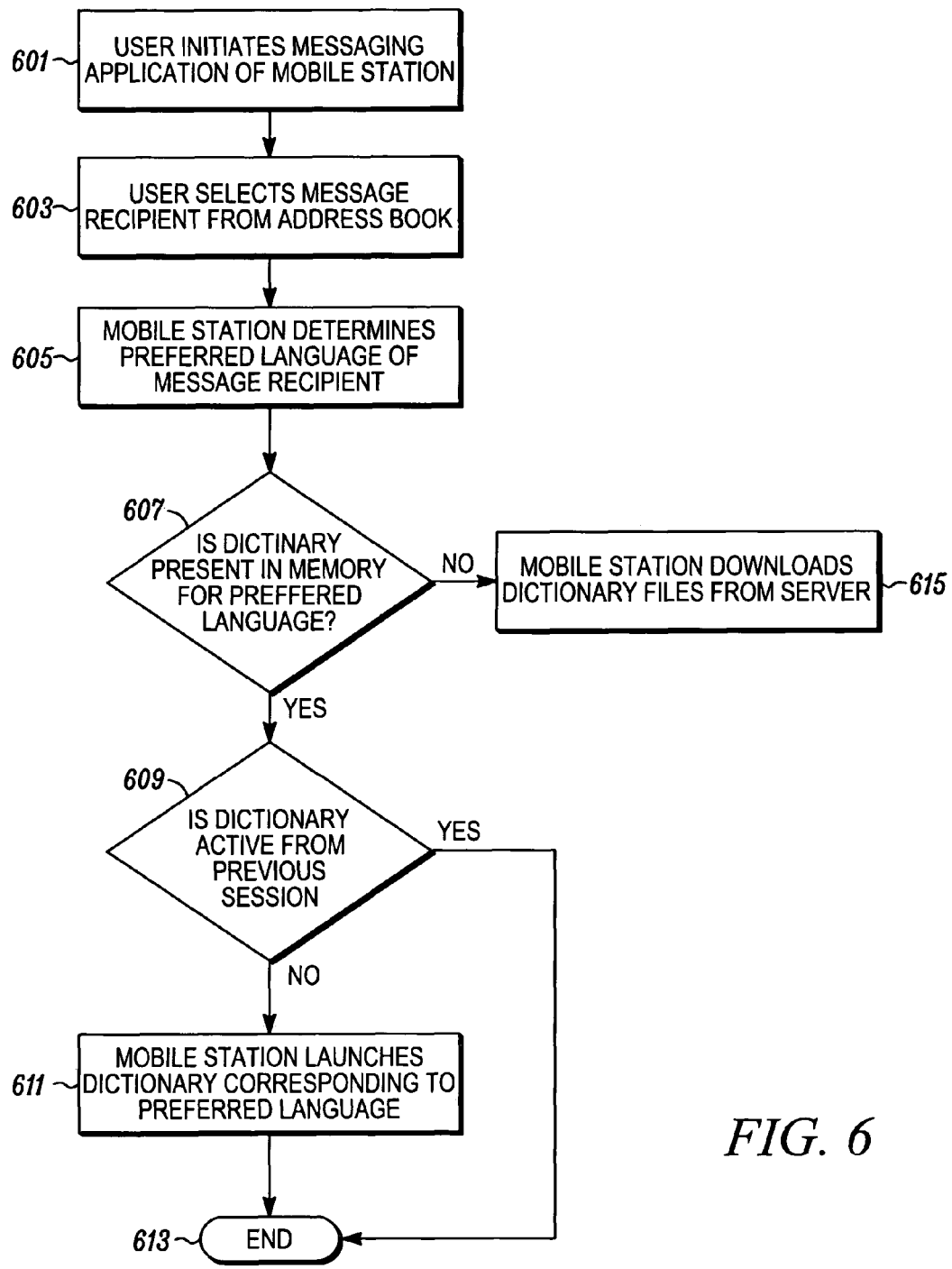
FIG. 6 is a flow diagram illustrating logic details of operation in accordance with some embodiments of the present invention.

FIG. 6 is a flow diagram illustrating further logic details of operation in accordance with some embodiments of the present invention. In block 601, a user initiates a mobile station messaging application and in block 603 selects one or more recipients. In block 605, the mobile station determines a preferred language by checking for example, a preferred language field 407 in an address book entry 400 contained in mobile station file storage 211. In the case of multiple message recipients, the mobile station will default to the preferred language of the first selected recipient.

In block 607, an application of mobile station applications 209, which may be the messaging application or a separate application, will determine whether file storage 211 contains an appropriate dictionary for the first selected message recipient's preferred language.

If the dictionary is present in file storage 211, the mobile station proceeds to block 609 and determines whether the dictionary is already active from a previous message session. If the dictionary is not active, the mobile station launches the dictionary in block 611. If the dictionary is already active, then the application ends at block 613 and is not invoked until the user chooses to initiate a new message.

Returning to block 607, the mobile station may determine that the dictionary required for the message recipient's preferred language is not present in file storage 211. In this case, in some embodiments of the present invention, the mobile station may establish a connection with a file server 121 using a wireless interface such as wireless interface 105 and wireless interface 109. The mobile station may then download the appropriate dictionary from file server 121, store it in file storage 211, and launch it for the active message composition session. The download of the dictionary file or files may further comprise billing transaction, authentication, registration, etc. as understood by one of ordinary skill and still remain in accordance with the embodiments of the present invention.

It is important to note that the mobile station user need not change language default settings for the mobile station operating system, or for any particular messaging application using the various embodiments of the present invention. If a default language setting exists, then the default language setting would apply to any message recipients having address book entries without a preferred language indicated in language preference field 407.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of operating a mobile station comprising:
   initiating a messaging application of the mobile station;
   selecting a message recipient of the messaging application from an address book;
   determining a preferred language of the message recipient based on an address book entry of the address book for the message recipient;
   determining whether a dictionary for the preferred language is available in a memory of the mobile station;
   downloading from a remote server at least one of a mobile station application and a new dictionary corresponding to the preferred language if the dictionary is not available;
   launching the dictionary for the preferred language; and
   using a dictionary feature for subsequently entered text.

2. A method of operating a mobile station comprising:
   initiating a messaging application of the mobile station;
   selecting a message recipient of the messaging application from an address book;
   determining a preferred language of the message recipient based on an address book entry of the address book for the message recipient;
   determining whether a dictionary for the preferred language is already activated from a previous session;
   launching the dictionary for the preferred language if the dictionary is not already activated; and
   using a dictionary feature for subsequently entered text.

* * * * *